United States Patent [19]
Pegon

[11] Patent Number: 4,819,973
[45] Date of Patent: Apr. 11, 1989

[54] HERMETIC CONNECTION DEVICE AND METHOD OF PROVIDING HERMETIC CONNECTION

[75] Inventor: Daniel Pegon, Montreuil, France

[73] Assignee: Societe Precision Generale, Montreuil, France

[21] Appl. No.: 118,033

[22] Filed: Nov. 6, 1987

[30] Foreign Application Priority Data

Nov. 6, 1986 [FR] France .................. 86 15485

[51] Int. Cl.$^4$ ............................................. F16L 19/06
[52] U.S. Cl. .................................. 285/332.3; 285/340; 285/363; 285/917
[58] Field of Search ...................... 285/332.3, 917, 340, 285/363, 332.2; 277/236

[56] References Cited

U.S. PATENT DOCUMENTS

| | | | |
|---|---|---|---|
| 1,721,325 | 7/1929 | Wilson | 285/917 X |
| 1,721,326 | 7/1929 | Wilson | 277/236 |
| 2,898,000 | 8/1959 | Hanny | 277/236 |
| 3,490,777 | 1/1970 | Emmerson | 277/236 X |
| 3,537,733 | 11/1970 | Martin | 285/332.3 |
| 3,602,532 | 8/1971 | Ehrenberg | 285/917 X |
| 3,630,553 | 12/1971 | Foulger | 285/917 X |
| 4,601,498 | 7/1986 | Haugen | 285/332.3 |

FOREIGN PATENT DOCUMENTS

| | | |
|---|---|---|
| 1937399 | 2/1971 | Fed. Rep. of Germany . |
| 1540946 | 8/1968 | France . |
| 2036502 | 12/1970 | France . |
| 908044 | 10/1962 | United Kingdom . |

*Primary Examiner*—Thomas F. Callaghan
*Attorney, Agent, or Firm*—Mason, Fenwick & Lawrence

[57] ABSTRACT

Hermetic connection device comprising a double curve ductile joint (3) and two supports (1,2), the joint (3) being connected between the two supports (1,2) stressed towards each other along axis (8) and defining on one section of their thickness only two parallel surfaces (4,5) at an angle to axis (8), characterized in that in the normally clamped state the geometric characteristics of the supports (1,2) and of the joint (3) are such that contact between the joint (3) and the two supports (1,2) is made on the one hand through each inclined surface (4,5) respectively along a line of contact (9,10) and on the other hand by each extreme end of joint (3) supported against another surface (6,7) of the male support (1) or female support (2) respectively.

11 Claims, 3 Drawing Sheets

HERMETIC CONNECTION DEVICE AND METHOD OF PROVIDING HERMETIC CONNECTION

The invention relates to a hermetic connection device having a double curve ductile joint and the use of such a device.

French specification FR No. 154096 discloses a metal joint with a double curve which enables connections, flanges or junctions to be realised between two supports. Such connections take up little space and generally assure excellent sealing with regard to all types of fluid, particularly gases, under extreme conditions of use (very high or very low pressures or temperatures, vibration, flexing . . . )

To date these known connections have been used with large opposing clamping forces of the supports so as to obtain a plastic flow in the joint to ensure that the connection is tight with regard to all kinds of fluid, particularly gases.

These known connections do, however, have certain drawbacks. In particular, it has been established that the known connections do not bear sudden thermal shocks very well nor differential dilation and deformation in deflection, compression or traction, all of which are relatively frequent occurences encountered in the conditions under which these joints are utilised. It has also been noted that the known connections cannot be deformed in an elastic manner and that they deteriorate rapidly when subjected to vibration.

British specification GB No. 908 044 (Lockheed Aircraft Corp) discloses a hermetic device in which the joint has a cross section in the form of a cross. Although this document provides for the possibility of only clamping the joint in the elastic area, this information which is applicable to a cross-shaped joint cannot be transferred by a specialist to a joint with a double curve which functions differently. Furthermore the ends of the arms of the cross, being pointed, tend to penetrate into the supports, particularly in applications where the device is subject to severe thermal or mechanical conditions.

German specification No. 1 937 399 (GAMAH CORP) discloses a sealing device comprising a joint of rectangular cross section which has not been realised in practice and is of poor quality.

French specification No. 2 036 502 (LE JOINT FRANCAIS) discloses a sealing joint with double curves but which is used in very different conditions from those of French specification FR No. 1 540 946, without providing contact between the joint and the inclined supports in the clamped state. Such a joint cannot be used in extreme conditions due to its poor performance.

Furthermore, a need has arisen for connection devices which perform better than the state of the art with regard to tightness, conditions of use and cost price. It has therefore become desirable to produce joints which are tight with regard to all types of fluid, particularly gases at pressures in the order of $10-10$ Torr ($1,332.10 -8$ Pa) or more, or of the order of 300 bars ($3.10\ 8$ Pa) or more, and/or subjected to temperatures of $-250$ C. or less, or 1200 C. or more and/or under intense vibration.

The invention is intended to eliminate these problems by improving the performance of the known connections and has as its aim a high-performance hermetic connection device of the type in French specification FR No. 1 540 946 able to withstand thermal shocks, particularly differential dilation, deformation in flexing and/or compression and/or traction, intense vibration and which exhibits better elasticity than known connections. Another aim of the invention is to reduce the cost price of such a connection at the same time.

A further aim of the invention is to propose a new utilization of such a connection device which considerably increases performance in the aforementioned conditions.

In order to do this the invention provides for a hermetic connection device comprising on the one hand a ductile joint with a double curve, and on the other hand, two supports, the joint being between the two supports stressed towards each other with regard to a clamping axis which define on one part of their thickness only two parallel surfaces inclined with regard to the axis, in which, in the normally clamped state, the geometric characteristics of the supports and the joint are such that contact between the joint and the two supports is made partly with each inclined surface and a single line of contact, and partly by each extreme end of the joint supported respectively against another surface of the male or female support.

Contact between the extreme ends of the joint and the surfaces of the support takes place at the same time as contact between the joint and the inclined surfaces when the two supports are brought towards each other. The extreme ends of the joint are flat and parallel and the surfaces of the corresponding support are flat and perpendicular to the clamping axis. In the normally clamped state the constraints in the joint are less than the elastic limit of the material of which the joint is made, the latter generally preserving its double curve shape. The device preferably includes means of controlling the clamping force of the two supports with regard to each other.

The invention also relates to the use of a device according to the invention, of a type in which a joint is arranged between two supports with the two supports being clamped towards each other, the clamping force of the two supports with regard to the joint between them being controlled in such a way that the stresses caused within the joint are less than the elastic limit of the material constituting the joint which preserves its general double curve form in the normally clamped state, contact between the joint and the supports not being modified by clamping.

Surprisingly, and contrary to the prior art, it has been found that controlling the clamping force, more particularly limiting this force by clamping the joint disclosed in French specification FR No. 1 540 946 less forcefully, increases the sealing performance of the device. Furthermore it has been shown that the device according to the invention does not only perform better but also exhibits some interesting advantages, i.e. it better withstands thermal shocks and differential dilation, deformation in flexing and/or compression and/or traction, intense vibration and possesses good elasticity. Additionally, the geometry of the joint and supports is simpler, than that of previous connections, which significantly reduces the manufacturing costs of the invented device.

The inventions will be better understood through the following description of one prefered embodiment with reference to the attached drawings.

Figure 1:
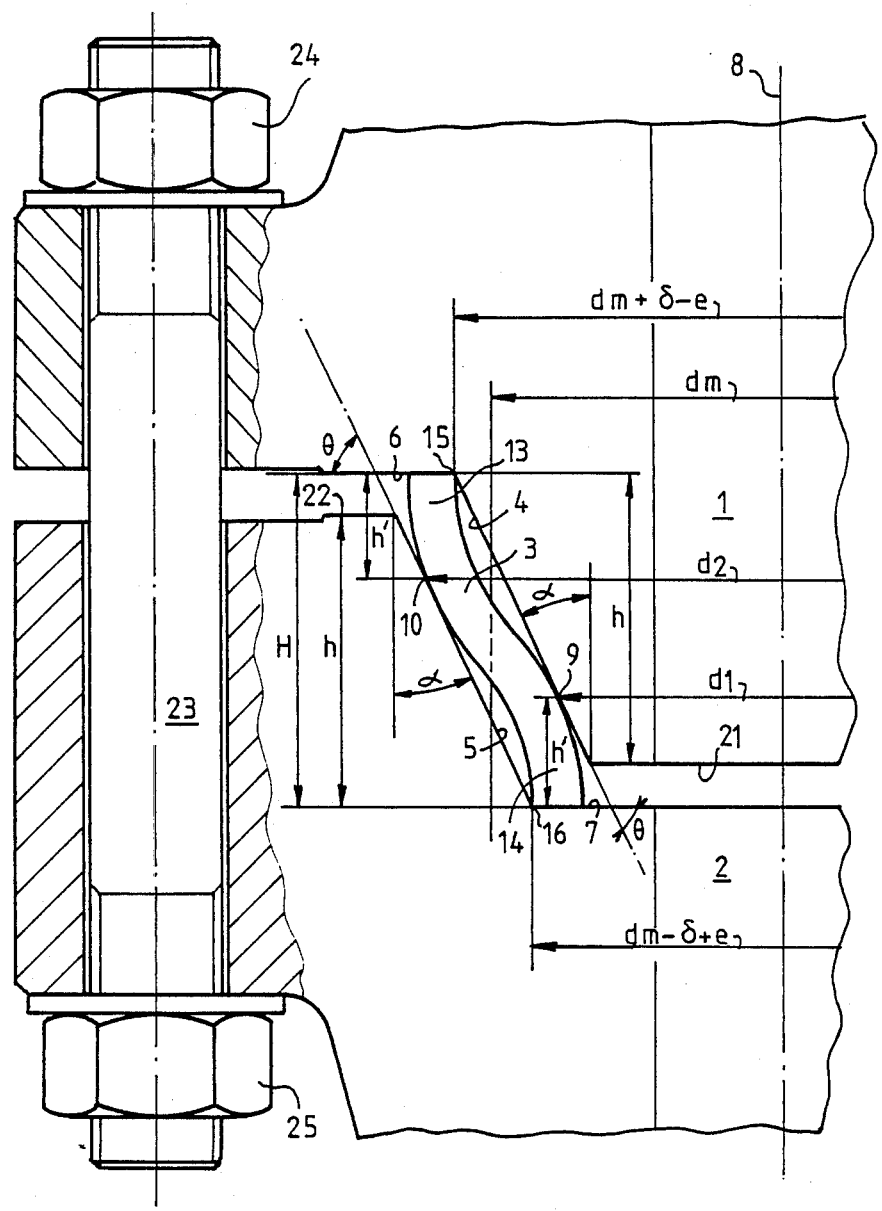
FIG. 1 is a schematic section through a plane containing the clamping axis of a device according to the invention shown in the normally clamped state.
Figure 2:
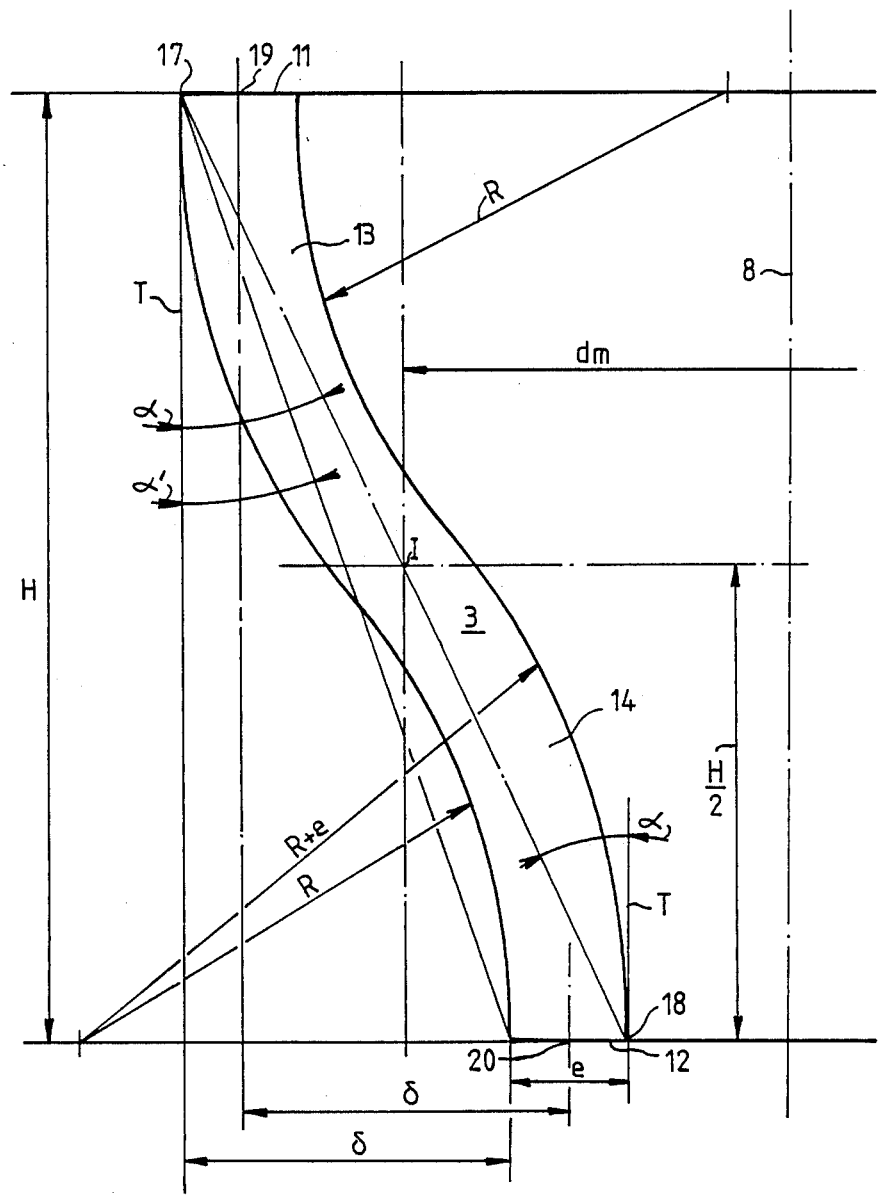
FIG. 2 is a schematic section through a plane containing the clamping axis of a joint of a device according to the invention shown in the normally clamped state.

The invention relates to a hermetic connection device for two supports 1,2 via an intermediate ductile double curve seal joint 3. A device according to the invention comprises joint 3 and two supports 1,2. The two supports 1,2 are formed by the free surfaces 4,5,6,7 of two sections between which a hermetic connection is to be made, that is to say a connection which is tight with regard all types of fluid, particularly gases. The surfaces 4 and 5 are inclined surfaces and the surfaces 6 and 7 are facing surfaces. The term "double curve" is used here in a general sense known to a specialist in sealed joints, and as described in French specification No. 1540946. A double curve joint 3 has a cross section comprising a point of bow I and two branches 13,14 which are symmetrical with regard to this point of bow I.

Joint 3 is arranged between the two supports 1,2 which are clamped towards each other in clamping direction 8 shown by clamping axis 8 in the figures. Each support 1,2 defines on only one section of its thickness (perpendicular to clamping axis 8) a surface 4,5 which is inclined with regard to clamping direction 8, the two inclined surfaces 4,5 being parallel to each other. The two supports 1,2 overlap.

Thus a male support 1 and a female support 2 can generally be defined, the male support 1 projecting axially whereas the female support 2 forms a corresponding axial recess (that is, in the clamping direction 8). The terms "male" and "female" are used to distinguish supports 1,2 even though in practice and in certain specific embodiments the supports are similar (for example in the case of rectilinear components).

The relationships between the essential features of supports 1,2 and joint 3 of a device according to the invention, i.e. inclination of surfaces 4,5 and curves and thickness of joint 3 are known from French specification No. 1540966 and are not described in more detail.

The complex of geometric features of supports 1,2 and joint 3 is such that contact of joint 3 with the two supports 1,2 is partly realised with each inclined surface 4,5 respectively along one and one only line of contact 9,10 and partly by each extreme end 11,12 of joint 3 supported respectively against another surface 6,7 of the male support 1 or female support 2. Furthermore, according to the invention, these geometric characteristics are such that contact between the extreme ends 11,12 or joint 3 and surfaces 6,7 of supports 1,2 occurs at the same time as contact between joint 3 and inclined surfaces 4,5 when the two supports 1,2 are brought towards each other.

In one use according to the invention of such a hermetic connection device, the clamping force of the two supports 1,2 towards each other with joint 3 between them is controlled, more particularly, limited, in such a way that the stresses in joint 3 remain less than the elastic limit of the material constituting joint 3 which preserves its generally double curve form.

A connection device according to the invention comprises means of controlling the clamping force of the two supports 1,2 towards each other with joint 3 between them.

Each surface 6,7 corresponding to an extreme end 11,12 of joint 3 forms an acute angle 0 to inclined surface 5,4 corresponding to branch 13,14 of joint 3 containing these ends 11,12.

Preferably, the extreme ends 11,12 of joint 3 are plan parallel to each other and surfaces 6,7 of supports to which they correspond are at least plan perpendicular to clamping axis 8. Ends 11,12 of the joint are also perpendicular to clamping axis 8 when the device is in the normally clamped state. Furthermore, extreme ends 11,12 of joint 3 are perpendicular to the direction of tangent T to joint 3 adjacent to ends 11,12.

The surface 6 of male support 1 corresponding to an extreme end 11 of joint 3 defines a a concave sharp intersection edge 15 with male inclined surface 4, surface 7 of the female support 2 corresponding with the other extreme end 12 of joint 3 defining a concave sharp intersection edge 16 with inclined female surface 5.

A connecting device according to the invention is often used for hollow cylindrical components such as pipes, often with a circular cross section. However, it is clear that such a device can be adapted to other shapes of components (rectilinear, polyhedral . . . ). The shapes of supports 1,2 and joints 3 are consequently adapted. In the case of pipes (see French specification No. 1 540 946), described in more detail below, supports 1,2 and joint 3 are symmetrical about clamping axis 8. The inclined surfaces 4,5 are truncated, surfaces 6,7 corresponding with extreme ends 11,12 being at least radially annular, lines of contact 9,10 of joint 8 with truncated surfaces 4,5 being closed at least in a circular fashion.

Inclined surface 4 of male support 1 is inclined in such a way that the projection has a thickness which diminishes in the direction of male support 1 towards female support 2, inclined surface 5 of female support 2 being inclined so that the complementary recesses widen out in the direction of the female support 2 towards male support 1, and contact between joint 3 and support 1,2 is partly through an extreme end 11,12 of a branch 13,14 and partly by the other branch 14,13 along one and only one line of contact 9,10 against inclined surface 4,5 of said support 1,2.

The example of an embodiment which is illustrated will not be described assuming, in a non-limiting manner, that the device is rotationally cylindrical about axis 8.

As has already been stated, joint 3 has a "S"-shaped cross section and comprises two branches 13,14 with curvature radii R. The two extreme ends 11,12 are at a distance H which is also the height of joint 3, characteristic of the connection device. The two branches 13,14 are joined tangentially to form bow I half way along. Joint 3 is symmetrical with regard to a circle passing through I, centered on axis 8 and with a diameter dm. The two circles 17,18, the outermost of joint 3, define the angle α of inclination of joint 3 which is characteristic of the connection device. Offset δ, distance between median circles 19,20 of ends 11,12, as well as thickness e of joint 3 are also characteristics of the connection device. However, offset δ can be expressed as:

$$\delta = H.tg\alpha - e$$

According to the invention the relationship H/e preferably consists of 4 and 18, which is more especially of the order 8.8. Tests have shown 8.84 as an optimum value.

Angle $\alpha'$ joining the two circles 17,22 or 21,28 of edges 11,12 located on the same side is expressed by $\alpha' = \text{arctg}(\delta/H)$ Radius of curvature R is thus expressed as $$R = \frac{H}{2 \sin 2\alpha'} - \frac{e}{2}$$

$$R = \frac{H}{2 \sin 2 \, \text{arctg}(\delta/H)} - \frac{e}{2}$$

Circle of contact 9,10 of branch 13,14 with truncated inclined surface 4,5 is located at:

$$h' = \sin\alpha' \cdot \frac{H}{2 \sin 2 \, \text{arctg}(\delta/H)} + \frac{e}{2}$$

of extreme end 11,12 of this branch 13,14.

Each support 1,2 is constituted by the truncated contact surface 4,5 with circle 9,10 of joint 3, the plane radial contact surface 6,7 with edge 11,12 of joint 3, and a free surface 21,22 parallel to the plane radial contact surface 6,7, at a distance h from the radial contact surface 6,7 which is the characteristic height of support 1,2. The two radial contact surfaces 6,7 and free surfaces 21,22 of a support 1,2 delimit the truncated surface 4,5.

The two supports 1,2 are of the same height h. The height h is less than height H of joint 3 in order to avoid contact between the opposite radial surfaces 6,22 and 7,21 of two separate supports 1,2. The interrelationship is advantageously between 1,2 and 1,4, more particularly in the order of 1,271.

The large diameter of the male truncated surface 4 has a value of $dm + \delta - e$ and the small diameter of the truncated female surface has a value of $dm - \delta + e$.

The small diameter of the male truncated surface 4 is less than diameter $d_1$ of circle of contact 9 with this surface 4, and the large diameter of the truncated female surface 5 is greater than diameter $d_2$ of circle of contact 10 with surface 5.

$$d_1 = dm - 2 \left[ \left( \frac{\delta - e}{2} \right) + R \cos\alpha + e \cos\alpha - R \right]$$

and $$d_2 = dm + 2 \left[ \left( \frac{\delta - e}{2} \right) + R \cos\alpha + e \cos\alpha - R \right]$$

Figure 3:
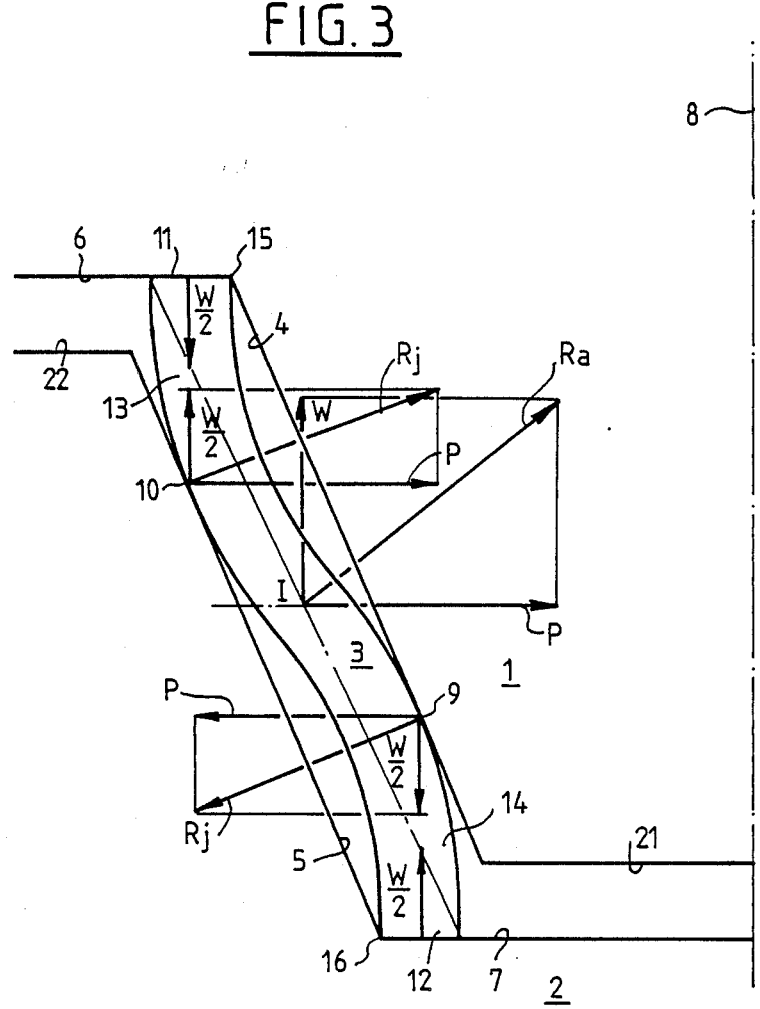
FIG. 3 is a partial schematic section showing the stresses on the joint when a device according to the invention is clamped, shown in the normally clamped state.

Axial force W (FIG. 3) applied to joint 3 for clamping purposes induces reaction Rj on circles of contact 9,10. The result Ra of these forces is:

$$Ra = W \sqrt{1 + \frac{1}{4 \, tg^2 \alpha}}$$

The theoretical constraints on join 3 are given by the following formulae which enable clamping force W to be controlled to avoid flow of joint 3:

axial compression: $\quad \sigma ja = \dfrac{w}{\pi \cdot dm \cdot H \cdot tg\alpha}$ radial shearing: $\quad \sigma jr = \dfrac{w}{2\pi \, dm \cdot H \cdot tg^2 \alpha}$ mean compression due to Ra: $\quad \sigma Ra = \dfrac{W \cos\alpha \sqrt{1 + \frac{1}{4} tg^2 \alpha}}{\pi \, dm \, H}$ moment of maximum flexing $\quad MFj \simeq \dfrac{W \cdot \delta}{4}$ Clamping force W for joint 3 can therefore be calculated and verified in practice by a knowledge of the properties of the material constituting joint 3. The means of clamping control can thus be regulated. These means of control are known and can be adapted depending on requirements (catch, stop at end of screw ...). The device can also be clamped by means of special tools such as dynamometric keys, ultrasonic control tools, hydraulic clamping tools and others, avoiding the need to adapt the control means integrated in the device. Means of axial stressing shown as an example are constituted by a threaded rod 23 and bolts 24,25.

Tests carried out have shown that the obtained tightness is almost perfect and better than that obtained with the prior art. Also it is obtained at a cost price which is the same or less.

TEST 1

Joints according to the invention were tested under severe pressure conditions ranging from secondary vacuum ($10^{-6}$ torr, i.e. $133.32 \times 10^{-6}$ Pa) up to 300 bars ($3.10^{-7}$ Pa). Leakage is measured by detection on an BALZER HLT 100 helitest bench at 20 C. The results obtained are set out in the following table in torr l/s (i.e. 1,3332/atm cm3/s or 1,3332.$10^{-10}$ Pa m3/s). The minimum leakage rate of $3.10^{-10}$ torr l/s.

| Characteristic of joint | | PRESSURE | | | | | |
|---|---|---|---|---|---|---|---|
| dm (mm) | e ($10^{-1}$ mm) | $10^{-6}$ torr | 10 bars | 50 bars | 100 bars | 200 bars | 300 bars |
| 10 | 5 | $3 \cdot 10^{-10}$ | $3 \cdot 10^{-9}$ | $3 \cdot 10^{-9}$ | $5 \cdot 10^{-9}$ | $5 \cdot 10^{-9}$ | $5 \cdot 10^{-9}$ |
| 34 | 5 | $3 \cdot 10^{-10}$ | $3 \cdot 10^{-9}$ | $2 \cdot 10^{-9}$ | $4 \cdot 10^{-9}$ | $5 \cdot 10^{-9}$ | $5 \cdot 10^{-9}$ |
| 72 | 8 | $4 \cdot 10^{-10}$ | $2 \cdot 10^{-9}$ | $2 \cdot 10^{-9}$ | $4 \cdot 10^{-9}$ | $3 \cdot 10^{-9}$ | $4 \cdot 10^{-9}$ |
| 102 | 10 | $5 \cdot 10^{-10}$ | $3 \cdot 10^{-9}$ | $2 \cdot 10^{-9}$ | $3 \cdot 10^{-9}$ | $3 \cdot 10^{-9}$ | $5 \cdot 10^{-9}$ |
| 132 | 12 | $5 \cdot 10^{-10}$ | $5 \cdot 10^{-9}$ | $4 \cdot 10^{-9}$ | $2 \cdot 10^{-9}$ | $5 \cdot 10^{-9}$ | $6 \cdot 10^{-9}$ |
| 172 | 15 | $8 \cdot 10^{-10}$ | $6 \cdot 10^{-9}$ | $3 \cdot 10^{-9}$ | $4 \cdot 10^{-9}$ | $4 \cdot 10^{-9}$ | $4 \cdot 10^{-9}$ |
| 211 | 12 | $8 \cdot 10^{-10}$ | $5 \cdot 10^{-9}$ | $5 \cdot 10^{-9}$ | $4 \cdot 10^{-9}$ | $5 \cdot 10^{-9}$ | $4 \cdot 10^{-9}$ |
| 300 | 15 | $9 \cdot 10^{-10}$ | $4 \cdot 10^{-9}$ | $4 \cdot 10^{-9}$ | — | — | — |
| 480 | 15 | $10^{-9}$ | $5 \cdot 10^{-9}$ | — | — | — | — |

TEST 2

A comparative test was carried out with regard to joints in accordance with French specification FR No. 1540946 (MARTIN) at 20 C. in a secondary vacuum of $10^{-6}$ torr ($133.32 \cdot 10^{-6}$ Pa). The results obtained, in torr.l/s ($1,3332.10^{-1}$ PA.m3/s) are set out in the following table.

The same helitest bench as in test 1 was used, the minimum detectable leakage rate being $3.10^{-10}$ torr. l/s

| CHARACTERISTICS OF JOINT | | JOINT ACCORDING TO | |
|---|---|---|---|
| dm (mm) | e ($\times 10^{-1}$ mm) | FR 1540946 | INVENTION |
| 10 | 5 | $1.10^{-8}$ | $3.10^{-10}$ |
| 34 | 5 | $2.10^{-8}$ | $3.10^{-10}$ |
| 72 | 8 | $1.10^{-8}$ | $4.10^{-10}$ |
| 102 | 10 | $1.10^{-8}$ | $5.10^{-10}$ |
| 132 | 12 | $3.10^{-8}$ | $5.10^{-10}$ |
| 172 | 15 | $4.10^{-8}$ | $8.10^{-10}$ |
| 211 | 12 | $6.10^{-8}$ | $8.10^{-10}$ |
| 300 | 15 | $4.10^{-8}$ | $9.10^{-10}$ |
| 480 | 15 | $8.10^{-8}$ | $10^{-9}$ |

Therefore an average improvement of $10^{-2}$ torr.l/s has been established between the prior art and the invention.

I claim:

1. A hermetic connection device comprising a double curve ductile seal joint having two extreme ends, two supports, said seal joint being positioned between the two supports, means for urging said two supports toward each other in a clamping direction, the supports defining two parallel inclined surfaces with respect to the clamping direction so that the seal joint when in its clamped condition is not permanently deformed and contacts an inclined surface of each support only along a line of contact extending in a plane oriented perpendicularly to said clamping direction with each extreme end of the seal joint also contacting a facing surface of one of the supports, the geometric characteristics of the supports and the seal joint being such that each extreme end of the seal joint come into contact with the facing surface of one of the supports at the same time as contact between the seal joint and the inclined surfaces takes place during movement of the supports toward each other in a clamping direction.

2. A hermetic connection device as recited in claim 1 wherein the facing surface of each support which engages the extreme end of the seal joint defines an angular concave intersection with said inclined surface of its respective support.

3. A hermetic connection device according to claim 1 wherein the facing surfaces of the supports are in a plane perpendicular to the clamping direction, and the extreme ends of the seal joint are parallel to each other and respectively contact one of the two facing surfaces of the supports.

4. A device according to claim 1 wherein the seal joint is of annular shape having an inner surface engaging one of said inclined surfaces and an outer surface engaging the other of said inclined surfaces and wherein the extreme ends of the seal joint are perpendicular to a tangent to the inner surface of the seal joint adjacent one end of the seal joint.

5. A device according to claim 1 wherein said supports and seal joint are symmetrical about an axis defining the clamping direction and the inclined surfaces are truncated.

6. A device according to claim 5, wherein the seal joint is of annular shape having an inner surface engaging one of said inclined surfaces and an outer surface engaging the other of said inclined surfaces and wherein the extreme ends of the seal joint are perpendicular to a tangent to the inner surface of the seal joint adjacent one end of the seal joint.

7. A device according to claim 6, wherein the facing surfaces of the supports are in a plane perpendicular to the clamping direction, and the extreme ends of the seal joint are parallel to each other and respectively contact one of the two facing surfaces of the supports.

8. A device according to claim 1 wherein the facing surface of each support is oriented at an acute angle with respect to the inclined surface of the same support.

9. A device according to claim 8 wherein one of said supports is a male support having a projection partially defined by the inclined surface of said male support and the other of said supports is a female support in which the inclined surface defines a complementary recess for receiving said projection of the male support.

10. A device according to claim 9 wherein said inclined surfaces are conical and said seal joint is S-shaped in cross-section.

11. A method of providing a hermetic connection between two supports with a seal joint having a double curve shape and also having first and second extreme end surfaces, said seal joint being arranged between said two supports which are movable toward each other in a clamping direction and which supports each include a facing surface oriented substantially transversely to said clamping direction and with said facing surfaces facing each other and wherein the supports each have an inclined surface inclined with respect to the clamping direction, said inclined surfaces being substantially parallel, said method comprising the steps of positioning said seal joint between said supports and providing a force on said supports for causing movement in said clamping direction so that contact between the seal joint and the supports is made with each inclined surface respectively through only one line of contact in a plane extending perpendicularly to said clamping direction with contact between said seal joint and said supports also being made at each extreme end surface of the seal joint against one of said facing surfaces with said force being controlled so that stress in the seal joint is always less than the elastic limit of the seal joint and the seal joint retains its general double curve shape while being clamped and the contacts between the seal joint and the supports are not modified during the clamping function.

* * * * *